July 18, 1939.　　　　R. F. HALL　　　　2,166,292
AIRPLANE
Filed May 5, 1937　　　　2 Sheets-Sheet 1
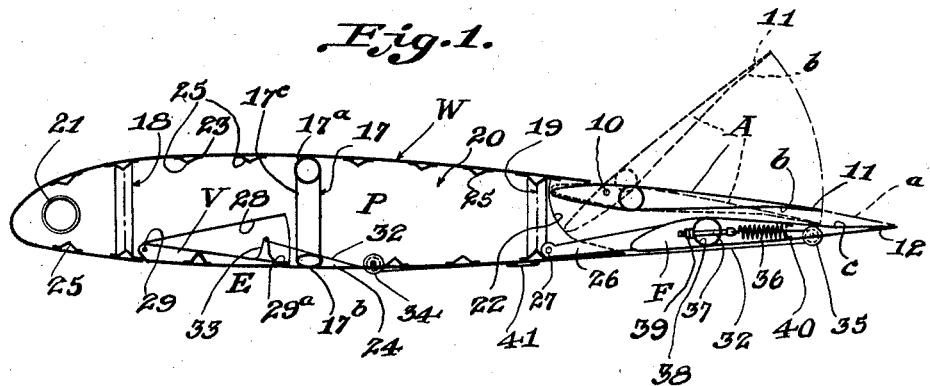
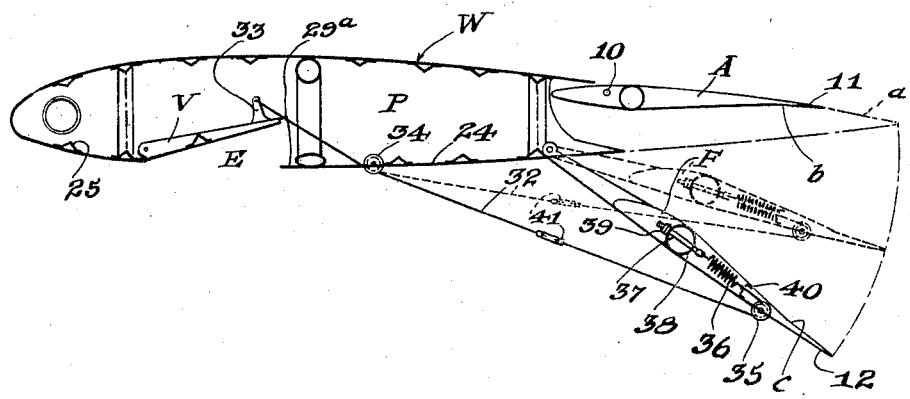
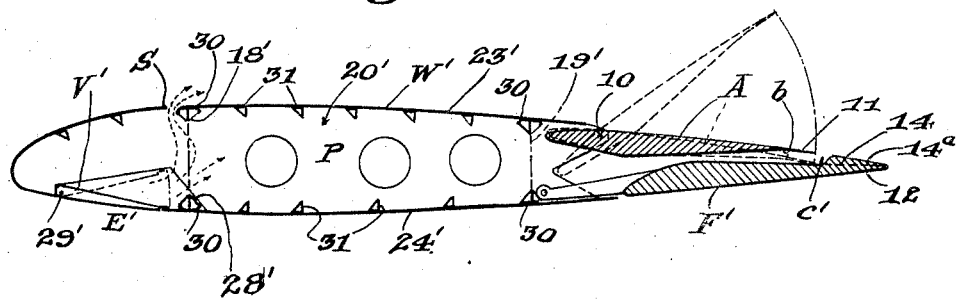
Inventor
Randolph F. Hall
By Allen Jack
Attorney July 18, 1939. R. F. HALL 2,166,292
AIRPLANE
Filed May 5, 1937 2 Sheets-Sheet 2
Fig. 4.
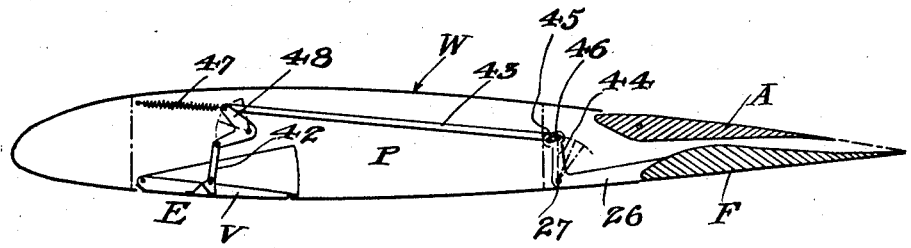
Fig. 5.
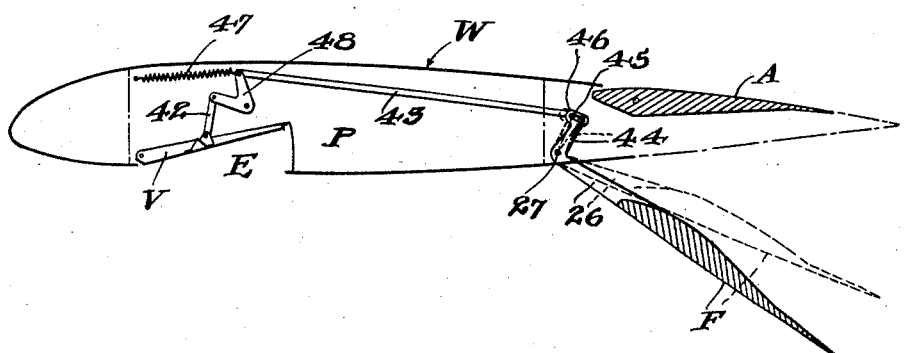
Fig. 6.
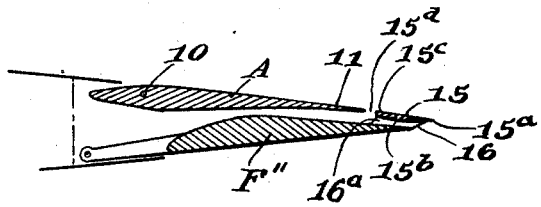
Randolph F. Hall, Inventor.
By Attorney Patented July 18, 1939

2,166,292

UNITED STATES PATENT OFFICE 2,166,292

AIRPLANE

Randolph F. Hall, Rochester, N. Y.

Application May 5, 1937, Serial No. 140,975

23 Claims. (Cl. 244—42)

The present invention relates to certain improvements in airplanes; and the nature and objects of the invention will be readily recognized and understood by those skilled in the aeronautical art in the light of the following explanation and detailed description of the accompanying drawings illustrating what I now believe to be the preferred embodiments or mechanical and aerodynamic expressions of my invention from among various other forms, embodiments, designs, combinations and constructions of which the invention is capable within the spirit and the broad scope thereof.

In certain designs and arrangements of airplane wings having angularly displaceable lateral or roll control surfaces or ailerons, due to the existence of wing structure or elements directly beneath such an aileron which interfere with and prevent down movement or displacement of the aileron, it is necessary to employ a type of lateral or roll control system for control operation of an aileron or ailerons by which lateral or roll control is obtained by solely the upward movement of a control surface or aileron. However, it is found that with such lateral or roll control systems depending for control solely upon the up movement of an aileron, there is frequently encountered an extremely disadvantageous condition of control system instability (overbalance) together with a poor control response for the range of small control movements of the system.

As an example of a wing design and arrangement in which wing elements are located below ailerons or lateral control surfaces so as to interfere with and prevent down movement of an aileron or control surface, reference is made to the type of wing having an angularly displaceable trailing under surface wing flap with an angularly displaceable aileron or control surface located directly above such flap. With such an arrangement, the flap, in its normal raised neutral position and the aileron in its normal neutral control position together carry out and define the basic airfoil section and contour of the wing, but the under flap below the aileron interferes with and prevents downward movement of the aileron so that it becomes necessary to employ a lateral or roll control system of the type hereinbefore referred to in which control is obtained by solely the upward movement of an aileron or control surface from its normal neutral position, without corresponding downward movement of an opposite aileron or control surface of the system.

In order to provide for downward movement of a lateral control surface or aileron in a wing design and arrangement which includes a wing flap beneath the aileron, the aileron has in some instances been regulated or set so as to have a negative angle when in its normal neutral control position, and/or the wing flap has been regulated and set so that it will have a positive angle when in its normal raised position. However, by so setting the aileron and the flap, the basic airfoil section and contour of the wing is changed. While such an arrangement has been more or less successfully used in actual flight operations with this design and arrangement of wing, yet a serious disadvantage is due to the fact that by setting the aileron at a negative angle and the flap at a positive angle when in their normal neutral positions, the characteristics of the basic airfoil or wing are changed.

One of the primary objects of my present invention is to provide a design and arrangement of a wing of the type having an aileron or control surface above a wing flap, in which arrangement any change in the characteristics of the basic airfoil section is avoided by maintaining the normal airfoil section and contour of the basic wing when the wing flap is in its normal raised position and the aileron or control surface there-above is in its normal neutral control position, while at the same time providing operating clearance between the flap and the aileron so that it is possible for the aileron to have down movement without interference with or obstruction from the wing flap when the latter is in its normal raised position maintaining the under surface contour of the basic airfoil section.

A characteristic of the invention in attaining the foregoing primary object is exemplified or typified by forming and shaping the under trailing portion of the aileron along its span and the upper surface of the wing flap along the span of the aileron there-above, so as to provide a clearance space between the aileron and the wing flap for downward control movement of the aileron when the aileron is in its normal neutral control position and the flap is in its normal raised position carrying out and preserving the basic airfoil section and contour.

A more specific feature and characteristic of the invention resides in so shaping the upper surface of a wing flap beneath an aileron as to form a spanwise disposed recess or depression along the upper side or surface of the wing flap in order to provide a space therebetween for operating clearance for the aileron to permit limited downward control movement of the aileon without interference from the wing flap therebelow, when the wing flap is in normal raised and basic airfoil section maintaining position and the aileron is in normal neutral control position.

Another general feature of the invention relates to the Hall type of variable or high lift wing which embodies a longitudinal passageway in the wing for flow of air rearwardly therethrough from an inlet in the forward under surface of the wing to a discharge at the trailing under portion of the wing. In this Hall type of wing, there is usually provided a vertically swingable or displaceable vane controlling forward inlet end of the passage with a trailing under surface wing lift varying flap controlling the rear discharge end of the passage to substantially close such passage discharge with the flap in its normal raised position and to open such passage with the flap in its lowered wing lift increasing position. With this wing arrangement, the front vane and flap are generally unconnected and independent, and the front vane closes when the wing flap is raised and is opened for inlet of air into the passage when the wing flap is in lowered high lift increasing positions. This type of variable or high lift wing has been used, and flight tests were made with the wing flap positively interconnected with and coupled to the front vane so that the front vane aided and to some extent balanced the operation of the wing flap.

Flight tests with the positively interconnected front vane and trailing wing flap established the fact that while the positive interconnection insured closing of the forward inlet end of the passage when the flap was fully raised, a condition which is desirable, yet the forward inlet end of the passageway was not fully opened until the flap was in its maximum completely lowered high lift position, a condition which was found not always desirable. Tests have shown and established that under some flight conditions, a quick or rapid opening of the forward inlet end of the passage by the front vane is desirable well in advance of complete lowering of the flap, that is, an opening of the passage by the front vane when the wing flap is only partially downwardly displaced or lowered.

A further feature and object of my present invention is to provide for interconnection of the front vane and the wing flap of this general type of high or variable lift wing, but to arrange such interconnection so as to provide for quick or rapid opening of the passageway by causing the front vane to assume maximum opened position when the wing flap is but partially downwardly displaced or lowered into a high lift position from its normal raised position. A further feature and characteristic of the invention is found in an arrangement of the vane and flap interconnecting mechanism by which the vane will function to act as a balance for the flap during at least the initial portion of downward movement of the flap from normal flap raised position, but which will not interfere with or prevent full raising of the flap from lowered positions.

A basic characteristic of an arrangement of interconnected vane and flap of the present invention resides in positively holding the vane and flap in fixed relationship for certain flap positions while in certain other flap positions provision is made for freedom of movement of the front vane relative to and independently of the flap.

A further object of the invention is to provide for positively closing the passageway against inflow of air thereto when the flap is in its normal raised position, but to permit and provide for a quick or rapid maximum opening of the passageway for inlet of air when the flap is displaced downwardly from its normal raised position.

A further general object of the invention is to provide for certain specific types and arrangements of vane and flap interconnecting mechanisms or means for carrying out the foregoing objects and features of the invention.

My invention also includes as an object thereof, the provision of an improved design and construction which is for so-called "monocoque stressed skin" types of wing which embody and include a longitudinal air displacement passage therein having the inlet opening thereof located in the forward under portion of the wing, such as generally typified by the Hall type of wing as hereinbefore referred to.

With the foregoing general objects, features and characteristics in view, as well as certain others which will be readily apparent from the following description and explanations, the invention consists in certain novel features in design and arrangement and in construction of elements, all as will be more fully and particularly referred to and specified hereinafter.

Referring to the accompanying drawings:

Fig. 1 is a more or less diagrammatic view in transverse vertical section through a passageway type of wing having a front vane for the passageway together with a trailing under surface wing flap and an aileron thereabove, all arranged to embody features of the invention; the front vane, wing flap and aileron being shown by full lines in their normal positions carrying out the basic airfoil section and contour of the wing and the raised and lowered control positions of the aileron being shown in dotted outline.

Fig. 2 is a view similar to Fig. 1 but showing the wing flap in its maximum lowered position with the passageway front vane in maximum opened position; a partially lowered position of the wing flap being shown in dotted outline.

Fig. 3 is a more or less diagrammatic view as in vertical transverse section through a modified design and construction of passageway wing to provide a full monocoque construction embodying certain features of the invention, and also showing a modified design and arrangement of wing flap and aileron there-above to permit down control movement of the aileron with the flap in normal raised position.

Fig. 4 is a more or less diagrammatic view in vertical transverse section through a wing of the passageway type such as shown in Figs. 1 to 3 but showing a modified arrangement of interconnecting mechanism between the wing flap and the passageway front vane, the flap being shown in its normal raised position and the vane in its normal passage closing position.

Fig. 5 is a view similar to Fig. 4 but with the flap shown by full lines in its maximum lowered position and the vane in its maximum opened position; the flap being shown by dotted lines in a partially lowered position while the vane is permitted to be in maximum opened position due to the arrangement of the interconnecting mechanism.

Fig. 6 is a diagrammatic view in vertical transverse section through a modified form of under trailing wing flap and aileron thereabove, which provides down control movement of the aileron with the flap in raised position, in which modification the upper surface contour of the base airfoil section is carried out by an auxiliary member mounted above the trailing edge of the flap.

A possible design and construction of a wing of the so-called Hall high or variable lift type embodying the features of the invention is disclosed in Figs. 1 and 2 of the drawings, and in this instance the wing is formed of a semi-monocoque type of preferable metal wing construction, although it is to be understood that the various features of the invention are in no sense limited or restricted to any particular or specific wing construction, as the invention is primarily directed to overcoming certain problems and difficulties fundamentally arising out of the arrangement and relationship of major elements of a wing of this type without regard to the specific construction of such element or other parts of the wing.

Referring to Figs. 1 and 2, the wing W of the so-called Hall type, includes and is designed to provide the longitudinal air displacement passageway P therethrough having its intake or inlet E through the undersurface of the wing adjacent the leading edge portion thereof, and its discharge at the trailing under surface of the wing. This passageway inlet or intake opening E is opened and closed by vertically swingable front vane V shown in passage inlet closing position in Fig. 1, and in passage inlet opening position in Fig. 2. A trailing under surface flap F is provided and mounted on the wing for vertical swinging or angular displacement between the normal raised position of Fig. 1 substantially closing the rear discharge from the passage and the lowered position of Fig. 2 opening the passageway P so that air is discharged or displaced rearwardly through the passageway and discharged rearwardly from the wing over the lowered flap F. An aileron or lateral control surface A is mounted on the wing above the wing flap F for vertical swinging or angular displacement for control, and is so positioned as to form a portion of and carry out the upper surface of the basic airfoil section and contour when in its normal neutral control position, as shown in Fig. 1 of the drawings.

In the form of this type of high or variable lift wing shown in Figs. 1 and 2, the flap F and front vane V are primarily designed and intended for automatic operation, although the type is not limited to automatic operation as the lift varying flap F may be positively and arbitrarily operated, as will be readily recognized by those familiar with this general type of wing. In flight operation with the wing W under high speed and low angle of attack flight, the flap F is in raised position of Fig. 1 and the vane V is in lowered position closing the inlet E to the passageway P. At high angles of attack and low speed flight conditions, the flap F swings downwardly and lowers to open the discharge end of the passageway P and the vane V swings upwardly to open the forward inlet end E of the passageway to permit rearward flow or displacement of air through the wing passageway, as will be clear by reference to Fig. 2 of the drawings.

In accordance with the invention, the trailing flap F in its normal raised position has its under surface so located as to form a trailing portion of the wing undersurface and carries out and defines the undersurface contour of the basic airfoil section, as disclosed in Fig. 1. The aileron A is mounted and disposed above the flap F for at least a portion of the span of the latter and is so positioned and relatively located on the wing W that in its normal neutral control position the upper surface thereof forms and carries out a trailing portion of the upper contour of the basic airfoil section, as shown by the full line position of aileron A in Figs. 1 and 2 of the drawings.

The aileron A is angularly displaceable or vertically swingable for control movements about the hinge axis 10 and in the example hereof, the aileron A extends rearwardly to terminate in the trailing edge portion 11 spaced forwardly a distance from the trailing edge portion 12 of the wing flap F so that for the span of the aileron, at least, the trailing edge portion 12 of the under surface flap forms and provides the trailing edge of the wing W. The relative positioning of the flap F and the aileron A with these elements in their normal neutral positions such as shown by full lines in Fig. 1, is such that a projection of the plane of the upper surface of the aileron A rearwardly and downwardly to the trailing edge of the flap will lie in a plane which defines and completes the trailing upper surface contour of the basic airfoil section of the wing W. Such projection of the upper surface of the aileron A rearwardly is indicated by the broken line $a$ shown in Figs. 1 and 2 of the drawings.

Following the principles of the invention, provision is made in the design and relative mounting of the under flap F and the aileron A there-above, to provide for downward control movement of the aileron A without interference from or obstruction by the flap F when the latter is in its raised position defining and maintaining the under surface contour of the basic airfoil section of the wing W. For instance, in the form of the invention of Figs. 1 and 2, the trailing portion 11 of the aileron A is formed of relatively small thickness to provide in effect a spanwise recess or depressed portion $b$ above the flap F. Similarly, the trailing portion 12 of the wing flap is formed of reduced thickness so that there is formed in effect a concavity or recess $c$ along the span of the flap with the forwardly and upwardly extending surface of this concavity or recess $c$ disposed substantially beneath the thin trailing edge portion 11 of the aileron A. It is to be noted that inboard the aileron, recess $c$ is not required, part of the rear upper surface of the raised flap being capable of defining a portion of the rear upper contour of the basic airfoil, the extent depending upon the trailing edge location of the fixed upper surface of the wing.

As a result of this design and arrangement and relative mounting of the under flap F and the aileron A there-above, the aileron A can be swung downwardly from the normal neutral control position thereof shown by full lines in Fig. 1 to the lowered position shown by dotted lines in Fig. 1, without interference from or obstruction by the under flap F, and further without displacing the under flap from its normal raised position defining and maintaining the under surface contour of the basic airfoil section. Moreover, by so forming and arranging the flap F and the aileron A, the basic airfoil section and contour for the wing W is maintained and preserved with the flap in its normal raised position and the aileron A in its normal neutral control position, yet the aileron A may have the downward control movement and the advantages obtained from the use of a lateral control or aileron operating system which provides some down movement for an aileron opposite an upwardly moving aileron, as generally referred to hereinbefore.

A modified formation and arrangement of a trailing wing flap with an aileron there-above by which the basic airfoil contour is maintained with the flap in normal raised position and the aileron in normal neutral control position, while permitting downward control movement of the aileron, is more or less diagrammatically disclosed in Fig. 3 of the drawings. In this form, the trailing under surface flap F' of the wing W' has the aileron A thereabove mounted and of a design similar to that of the aileron A in Figs. 1 and 2, that is, including the thin, trailing edge portion 11 to provide the under surface recess b. The aileron A has its trailing edge terminating spaced forwardly from the trailing edge portion 12 of the flap F', but instead of the reduced thickness trailing edge portion such as shown for flap F of Figs. 1 and 2, in the example of Fig. 3, the trailing edge portion 12 of the flap F has a raised or increased thickness portion 14 extending spanwise thereof and spaced a slight distance to the rear of the trailing edge 11 of aileron A so that there is a spanwise gap therebetween. The upper surface 14a of this raised portion 14 has a shape and contour chordwise thereof to define and carry out the normal basic trailing portion of the upper surface contour of the basic airfoil section when the flap F' is in its normal raised position, as clearly shown in Fig. 3 of the drawings. By this design and arrangement there is in effect a spanwise recess or depressed portion c' formed along the upper surface of the flap F' for the span of the aileron A so as to provide operating clearance between the flap and the aileron to permit downward control movement of the aileron when the flap and aileron are in their normal neutral positions maintaining and carrying out the basic airfoil section as shown by the full line positions of Fig. 3. The lowered or downwardly swung position of aileron A from its neutral control position, with the flap F' in normal raised position is shown by dotted outline in Fig. 3.

Another design and arrangement of the trailing edge portion of a trailing under surface wing flap in the combination with an aileron thereabove by which with the aileron in its normal neutral control position and the flap in its normal raised position, the basic airfoil section and contour is maintained and substantially carried out to the trailing edge of the wing along the span of the aileron, is more or less diagrammatically disclosed in Fig. 6 of the drawings. In this arrangement, the flap F" is provided with the auxiliary member or vane 15 along the span of the flap and is spaced a distance thereabove by means of suitable brackets or supporting structure 16 located at spaced intervals along the span of the flap to form a passage or slot 16a between the flap and member 15. The auxiliary member or vane 15, in this instance, extends a distance rearwardly beyond the trailing edge of the flap F" to form and define what is in effect the trailing edge 15a of the wing along the span of the aileron A thereabove.

This auxiliary member or vane 15 in the example hereof has a cambered under surface 15b and a substantially flat upper surface 15c, which upper surface lies in the plane of and substantially rearwardly carries out the upper surface contour of the base airfoil section as defined by the upper surface of the aileron A when the latter is in its normal neutral control position. Preferably, there is a gap 15d between the trailing edge portion 11 of aileron A and the leading edge of the auxiliary member or vane 15, as will be clear by reference to Fig. 6.

With the design and arrangement of flap F" of Fig. 6, the flap has its upper surface so formed that when in normal raised position defining the under surface of the basic airfoil contour, there is operating clearance for downward control movement of the aileron when the latter is in normal neutral control position. In this manner, the feature of the invention which provides for the wing flap in normal raised position and the aileron in normal neutral control position carrying out and defining the airfoil section and contour of the trailing portion of the basic wing airfoil, while providing for downward control movement of the aileron without changing the basic airfoil section of the wing, may be carried out.

In the specific form of the auxiliary fixed member or vane 15 of Fig. 6, I happen to show this auxiliary airfoil as having the cambered under surface 15b with a substantially flat uncambered upper surface 15c, but I wish to call attention to the fact that any other desired section may be employed for the auxiliary member, such, for example, as a symmetrical section, or a section in which the upper surface is cambered and the lower surface substantially flat.

Attention is directed to the fact that when the flap operates automatically, control movement of the ailerons from neutral position will, with proper design, result in forces acting upon the raised portion 14 of the flap or auxiliary member 15 to cause movement of the flap to aid the control response.

The broad and basic feature of my invention which provides for and makes possible downward control movement of an aileron mounted above an under surface wing flap with the latter in fully raised normal position, while the flap in its normal fully raised position and the aileron in its normal neutral control position maintain and preserve the contour and airfoil section of the basic wing, is not limited or restricted to any particular type or construction of wing or flap. While I have shown designs and arrangements for carrying out this broad feature as applied to wings of the passageway type, this feature is in no sense so limited and may be employed generally without regard to wing type where a wing flap or other wing element which defines a portion of the basic wing contour and section is associated and related with an aileron or other control surface or element, in a manner broadly typified by the specific examples herein disclosed.

Referring now to Figs. 1 and 2 of the drawings, I have shown more or less schematically, a design and construction for cantilever airplane wing which is particularly adapted to wings of the high or variable lift types having an air-displacement passageway therethrough controlled by a forward inlet vane and having a rear trailing under surface wing flap with an aileron mounted thereabove. Such construction provides a wing of what may be termed the semi-monocoque type, and is primarily intended for and adapted to metal construction.

This semi-monocoque type of construction for a wing W such as shown in Fig. 1, essentially includes a main open truss beam 17 having a round or circular tube upper longitudinal 17a, a lower oval tube longitudinal 17b, and suitable interconnecting web bracing 17c. Front and rear open vertical shear trusses 18 and 19, respectively, are provided spaced forwardly and rearwardly from the main beam 17, and a series of contour formers or sheet metal ribs 20 extend transversely across the beam and trusses chordwire of the wing, which contour formers or ribs are, as usual, spaced apart spanwise or longitudinally of the wing. The ribs or contour formers 20 may be provided with lightening holes or openings 21, and each rib or contour former at its rear end or edge 22 is cut away and shaped just aft of the rear shear truss 19 to provide clearance for the leading edge of the angularly displaceable aileron A in its vertically swinging control movements about the hinge axis 10.

A stressed upper and lower skin or covering 23 and 24 encloses the wing and the construction is essentially completed by the series of spanwise disposed stringers 25 extending spanwise of the wing across the ribs 20 and being spaced apart chordwise of the wing. These stringers 25 are in this instance substantially V-shaped in cross section and the contour formers or ribs 20 are cut out or notched to receive these stringers to which they are connected, the stressed wing skin or covering 23—24 being connected to the stringers and to the contour formers and reinforced thereby.

In this example, the trailing under surface wing flap F is mounted on the wing by remote hinge arms 26 spaced along the span thereof and extending forwardly therefrom to hinge or pivot points 27 located at the rear shear truss 19. In normal raised position, the flap F, as shown in Fig. 1, and as hereinbefore described, rearwardly carries out the under surface or skin 24 of the wing to define the contour of the trailing portion of the basic wing airfoil section. Due to the remote hinge arms 26, the leading edge of the wing flap F is spaced from the lower surface of the wing when the flap is in lowered positions so that a gap is formed for flow of air rearwardly between the wing and flap, as will be clear by reference to Fig. 2.

The aileron A is mounted above wing flap F for angular displacement about the hinge axis 10, all as hereinbefore explained, and carries out the trailing portion of the upper skin or surface 23 of the wing when in normal neutral control position as shown in full lines in Fig. 1. It may be here noted that where an aileron A is employed which extends for only a portion of the span of wing W, the upper surface of the wing inboard of the aileron could extend rearwardly long and lie within the contour line a to maintain the basic airfoil section (see Fig. 1).

With the semi-monocoque type of construction with a wing of the Hall passageway type, the under surface skin or covering 24 has the passageway inlet opening E formed therethrough extending spanwise of the wing and located between the main beam 17 and the front shear truss 18. The contour formers or ribs 20 are cut out to form upwardly extending openings 28 which increase in depth rearwardly and which are designed to receive the vane V and permit vertical swinging of the vane about its hinge axis 29, from normal closed position of the vane as shown in Fig. 1 to opened position of the vane as shown in Fig. 2. The vane V extends along the span of the inlet E and is mounted on the wing by the hinge axis 29 along and to the rear of the forward shear truss 18, with the vane extending rearwardly across the inlet and terminating in the upwardly offset trailing edge 29a. In lowered, inlet E position of vane V, the offset trailing edge 29a thereof extends over the leading edge of the under skin 24 at inlet E and thus forms a lowered position stop for the vane, as well as positioning the under surface of the vane in the lower surface contour for the basic airfoil section (see Fig. 2). In some wing designs the passageway P may extend through only certain span distances, localized portions of the wing being in effect partitioned or closed for structural, aerodynamic, maintenance, floatation or load carrying purposes; in which case the vane V will only be located along the span with the passageway.

Another type of wing construction is shown in Fig. 3 of the drawings, which provides a full monocoque wing W' particularly well adapted for the Hall passageway and flap type of variable or high lift wing. In this construction, the wing embodies a front or forward open shear truss 18' and a rear open shear truss 19' with each of these trusses including extruded upper and lower T-section longitudinal truss members 30, which front and rear shear trusses are connected by the chordwise disposed and spanwise spaced metal contour formers or ribs 20' with the upper and lower longitudinal stringers 31 extending across and connected to the contour formers or ribs, the ribs being suitably cut out to receive the stringers and the stringers being in this instance of substantially L-shape in section. The wing is completed by the upper and lower skin or covering 23' and 24' to provide a full monocoque type of construction. The wing is completed by the trailing under surface wing flap F' and the aileron A thereabove which are mounted and arranged in a generally similar manner to that explained in connection with the wing of Fig. 1.

The full monocoque wing construction of Fig. 3 includes as a feature the mounting and location of the under surface inlet for the wing passage P and the front vane controlling this passage, forward of the front shear truss 18' and in the leading edge portion of the wing. This arrangement utilizes the front vane so mounted and located to provide torsional rigidity for the wing. For instance, in the example of Fig. 3, the spanwise disposed passage inlet opening E' for wing W' is formed in the under surface or skin 24' of the wing forward of the front shear truss 18' and the vane V' is pivoted or hinged at its leading edge for vertical swinging about the hinge axis 29' in the manner as hereinbefore described for this type of vane; the wing ribs or contour formers 20' being provided with the cut out portions 28' to permit the vertical swinging of the vane in operation of the wing.

Following a further feature of my invention, I provide a spanwise disposed optional slot or slots S in the upper surface or skin of the wing just forward of and along the upper longitudinal of the front shear truss 18', or nearer the wing leading edge, so as to provide for flow of air upwardly and outwardly therethrough and rearwardly along the upper surface of the wing when the vane V' is in opened position for rearward displacement of air through the passage P. The provision of such a slot or slots S in the Hall type of wing generally typified herein is disclosed in my pending United States patent application filed August 2, 1935, Serial No. 34,451. If desired or found expedient, other slots may be provided through the wing upper surface in communication with the wing passageway P, such for example as disclosed in my pending United States patent application filed September 19, 1935, Serial No. 41,313.

An important phase and feature of the invention disclosed herein relates to the interconnection of the rear wing flap and the front vane of a high or variable lift wing of the so-called "Hall" type, such, for example, as hereinbefore generally referred to, and in accordance with the principle of the invention on which this feature is based, the interconnection is carried out in such a manner that substantially positive closing of the front vane is insured when the wing flap is in normal fully raised position, yet the front vane is capable of relatively rapid or quick full opening upon downward displacement of the flap and in advance of the flap attaining its maximum lowered position. More broadly stated, for a portion of the range of angular displacement of the flap F, the front vane is capable of movement independently of the flap, while for certain other portions of the range of angular displacement, the front vane has relatively positive connection with the flap and is maintained against independent movement relative thereto.

One specific arrangement of such an interconnecting mechanism is more or less diagrammatically illustrated in Figs. 1 and 2 of the drawings, as of what may be called a cable type. In this arrangement, the front vane V is interconnected with the rear wing flap F, by a cable 32 which extends downwardly from the upper end of a crank arm or horn 33 mounted on the front vane V adjacent the trailing edge of the vane and disposed within the wing W. The cable 32 extends from the horn 33 rearwardly and downwardly through the wing to and over the forward side of a pulley 34 which is mounted in vertically disposed position in and extending downwardly through the under surface 24 of the wing for rotation about a horizontal axis disposed spanwise of the wing. From pulley 34, the cable 32 then extends rearwardly on the exterior of the wing along and adjacent the wing under surface to a point in the trailing portion 12 of the rear wing flap F. The wing flap F carries a vertically and chordwise disposed pulley 35 extending downwardly through the under surface of the flap and rotatable about a horizontal axis. The cable 32 is extended upwardly around the rear side of said pulley 35 and then forwardly from the pulley into the flap F. The forward end of cable 32 is connected to the rear end of a tension spring 36 disposed substantially chordwise of and within the wing flap F.

The spring 36 is carried by and connected or hooked at its forward end to an eye bolt 37 which pierces and extends through the longitudinal tubular beam 38 of the wing flap. The eye bolt 37 is retained in the beam by the nuts 39 threaded onto the forward end of the bolt and through the medium of which the tension in spring 36 can be adjusted. Preferably, a fixed stop 40 is mounted within the flap to receive, and against which, the rear end of the spring 36 engages, in order that the front vane V may be positively held closed when the flap is in its raised position. Attention is directed to the fact, however, that such a stop is not an essential element and may, if desired, be dispensed with and the spring 36 so tensioned when the flap is in raised position as to maintain the vane V substantially closed. A turnbuckle 41 may be inserted and included in the cable 32 at a suitable point to permit adjustment of the system, including an adjustment which would result in substantial release of the spring 36 from the stop 40 to permit opening movement of the vane V even with the flap F raised during certain unusual conditions of flight, if desired.

The relative points of attachment of the cable 32 to the front vane V and rear, trailing flap F are such that with the flap in its fully raised position of Fig. 1, the cable 32 is taut with spring 36 abutting and bearing against stop 40 so that the vane V is positively held in passage inlet closing position against opening. Now, as the flap F is swung or swings downwardly from its normal raised position, the cable 32 is released, and when the flap reaches a lowered position intermediate fully raised and fully lowered positions, say, a position approximately half of the total angular displacement possible for the flap, the cable will have released an amount which is greater than required to permit complete raising of the front vane V to its fully opened position of Fig. 2. Thus, with the interconnecting mechanism of the form of Figs. 1 and 2, positive closing of the vane V is insured with the flap in fully raised position but the vane V is permitted to open and can open when the wing flap is only partially downwardly displaced or lowered, as will be clear by reference to the partially lowered position of the flap shown by the dotted lines in Fig. 2.

When the flap F of the arrangement of Figs. 1 and 2 is raised, any load in the cable 32, such, for example, as may be imposed by the tension from the spring 36, can have but very small tendency to lower the flap because of the fact that the cable 32 passes so near to the flap pivot 27 with the flap in raised position. Until the flap F reaches the downwardly displaced position that will permit full opening of the vane V, if the tension load in the cable 32, due to the air pressure acting upwardly on the vane V is greater than the force exerted by spring 36, then the spring will remain against the stop 40, if such a stop is employed, and the vane, assisting the lowering of the flap, will open as rapidly as possible. On the other hand, excessive spring force would obviously retard opening of the vane V. The force from the spring 36 will tend to lower the flap after the vane V has reached its maximum raised position, as the cable possesses substantial leverage, as will be apparent from the position of the cable 32 as shown in Fig. 2 with the flap F lowered. It therefore follows that adjustment of spring 36 will permit not only variation in the automatic operation of the flap, where the flap is of the automatic type, but may also be used to modify the relationship of flap and vane movement, including the possibility of some opening of the vane in certain maneuvers when the flap is raised, should such opening be found desirable.

Flap and vane interconnecting means of the cable type such as disclosed in Figs. 1 and 2 may be spaced at intervals along the span of the flap and vane as may be required or found expedient, taking into account, of course, such factors as vane rigidity, hinge location, and other pertinent factors.

In Figs. 4 and 5 of the drawings, I have shown a modified arrangement of means for interconnecting the front vane V and the trailing under surface flap F of the wing of the general type hereinbefore under discussion. In this arrangement, a bell crank 48 is mounted within the wing W above the vane V for vertical rocking, and the lower arm of the bell crank 48 is connected to the vane V by a link 42. The upper arm of the bell crank 48 is connected to the flap F by the tube 43. The hinge arm 26 of the flap F has an upwardly extended crank arm extension 44 which is provided at its upper end with an elongated slot 45 to slidably receive a pin or bolt 46 carried by the rear end of the tube 43. If desired, the upwardly extended crank arm 44 of the flap may be forked and have the opposite legs thereof provided with slots such as 45, as will be readily understood.

Preferably, there are a plurality of such vane and flap interconnecting mechanisms spaced at intervals along the span of the wing and flap, and each interconnecting mechanism may include a spring 47 connected between a fixed point in the wing structure forward of a bell crank 48 and extended rearwardly to and connected with the upper arm of such bell crank. Such a spring or springs may be either of the tension or compression type for the purpose of preventing play and noise in the operation of the interconnecting mechanisms as well as for the purpose of enabling some measure of control operation modification. These springs 47 would ordinarily be fairly light and carry tension tending continuously to maintain the vane V closed.

In the flight operation of the form and arrangement of interconnecting means disclosed in Figs. 4 and 5, with the wing flap F in the fully raised normal position as shown in Fig. 4, the pin 46 carried by the connecting tube 43 is usually at the rear of the slot 45 in the upper end of the flap crank arm 44, and hence, the front vane V is positively held in its lowered position closing the passageway inlet E. As the vane V rises under the air forces acting upwardly thereon, while the flap F swings downwardly to lowered positions, the pin 46 will remain at the rear end of the slot 45 until the flap F has lowered more or less to a position such as indicated by dotted lines in Fig. 5, and, therefore, up to this point, or position, of the flap F, the vane V in opening to a raised position stop will serve to function as a balance for the flap operation. In this partially lowered position of the flap F as shown in Fig. 5 the vane V is then freed or to a degree released during the remainder of the down movement of the flap. With the flap F, say in maximum lowered position, such as shown by full lines in Fig. 5, and the vane V in its maximum raised, passage inlet opening position, when the flap F raises, it may do so without interference from and independently of the vane V due to the fact that pin 46 is positioned at the forward end of the slot 45. Similarly, upward movement and raised positions of the flap F up to the position indicated in dotted lines in Fig. 5, at which arm 44 has swung forwardly relative to pin 46 to place the pin at the rear end of slot 45, the vane V is free to swing downwardly. Continued raising or upward angular displacement of the flap F from the dotted line position of Fig. 5 will then result in positive downward movement of the vane V by the action of the rear end of slot 45 against pin 46 as the arm 44 swings forwardly. When the flap F reaches its normal raised position of Fig. 4, the front vane V will then be positively held in lowered position closing the passageway inlet E.

Attention is here directed to the fact that in certain automatic flap system installations, the flap operation is slower for the initial range of flap movement downwardly than for the remainder of the range of movement to maximum lowered position, so that the front vane V, in an arrangement such as shown in Figs. 4 and 5 will function to assist and aid flap operation through this initial range of downward movement. The need for balancing or aiding flap operation beyond this initial range of downward movement is less essential. It should also here be pointed out that because the front vane V automatically tends to lower to close the wing passageway as the automatically operated flap raises at high speed, the interconnection of the flap with the vane will not hinder or interfere with the full raising of the flap F at low angle of attack, high speed flight conditions. Of course, it is understood that at high angle of attack or low speed flight conditions, the flap F automatically lowers when the passageway P is opened by the front vane E.

The specific flap and vane interconnecting mechanisms which I happen to have selected and disclosed in this particular instance, serve merely as examples for the purpose of explaining the broad principle and features of my invention. Obviously, various other mechanical arrangements of interconnecting mechanism or means of the lost motion types here disclosed or of other types of means for obtaining equivalent results may be utilized for carrying out the broad principle of the invention by which positive closing of the passage inlet controlling vane is maintained and insured with the trailing under surface wing flap in its normal raised position and by which the vane is released for relatively quick or rapid opening upon downward displacement of the wing flap to lowered position. Thus, fundamentally, there may be positive interconnection between the vane and flap for movement of such members together throughout a certain portion of the range of flap movement, during which portion of movement, the vane may function as a balance or in aid of flap operation, while, throughout the remainder of the range of flap movement, the vane is freed or released from the flap for independent movement relative to the latter, in order, from among other results, to provide for relatively rapid or quick passageway opening movement of the vane at preferably a predetermined position of the flap.

It is also evident that various other forms, arrangements, designs, constructions and combinations, as well as additions thereto or eliminations therefrom, might be resorted to without departing from the spirit and broad scope of my invention, and hence, I do not wish to limit the invention in all respects to the exact and specific disclosures hereof.

What I claim is:

1. In a wing, an angularly displaceable lift varying wing flap in the under side of the wing, the under surface of said flap with the flap in normal raised position forming and defining a portion of the under surface of the basic airfoil section and contour of the wing and having its upper surface formed to provide a spanwise recess in the trailing portion thereof, a control member mounted for angular displacement above said wing flap and in normal neutral control position having its upper surface forming a portion of the upper surface of the basic airfoil section and contour of the wing, and said control member downwardly displaceable from normal neutral control position with the wing in normal raised position whereby said flap upper surface recess portion receives the trailing portion of said control member with the wing flap in normal neutral control position defining a portion of the basic airfoil section and contour for the wing.

2. In combination, in a high lift wing, a wing lift varying flap, an aileron above said flap, said aileron and flap in their normal neutral positions defining and forming a portion of the contour of the basic airfoil section for the wing, said aileron and flap having trailing portions of their inner opposed surfaces formed substantially concave to provide clearance space therebetween when in their normal positions whereby said aileron can be moved downwardly from its normal position for control without displacement of the wing flap from its position maintaining the basic airfoil section contour.

3. In combination, in a high lift wing, a lift varying wing flap, an aileron above said wing flap and extending rearwardly thereover to the trailing portion of the flap, said aileron and flap in their normal neutral positions defining and carrying out the contour of the trailing portion of the basic airfoil section for the wing, said aileron and flap being mounted for independent, angular displacement and the inner opposed surfaces of the aileron and flap being so formed and designed as to provide a space therebetween for movement downwardly of the aileron from its normal neutral control position when the flap is in its normal neutral position without requiring displacement of the flap and change in the basic airfoil contour.

4. In combination, in a high lift wing, a lift varying wing flap, an aileron above said wing flap and extending rearwardly thereover to the trailing portion of the flap, said aileron and flap in their normal neutral positions defining and carrying out the contour of the trailing portion of the basic airfoil section for the wing, said aileron and flap being mounted for independent angular displacement relative to the wing, said wing flap extending rearwardly a distance beyond the aileron trailing edge so that the flap trailing edge provides a portion of the trailing edge of the wing, the portion of the flap to the rear of the aileron trailing edge formed to provide an upper surface rearwardly carrying out the upper surface contour of the basic airfoil section when the aileron and flap are in normal neutral positions.

5. In combination, in a high lift wing, a lift varying wing flap, an aileron above said flap, said aileron in its normal neutral control position and said flap in its normal raised position carrying out the contour of the trailing portion of the basic airfoil section for the wing, said aileron and flap being mounted for independent angular displacement relative to the wing, said flap extending rearwardly a distance beyond the trailing edge of the aileron so that the flap trailing edge for the span of the flap provides the trailing edge of the wing, the flap to the rear of the aileron trailing edge formed of increased thickness along the span thereof to provide an elevated upper surface rearwardly carrying out the upper surface contour of the basic airfoil section when the aileron and flap are in normal positions, and the upper side of the flap directly forward of the flap increased thickness forming a spanwise recess whereby the aileron may be downwardly displaced from neutral control position without displacing said flap from basic airfoil section contour maintaining position.

6. In combination, in a high lift wing, a wing lift varying flap, an aileron above said flap, said aileron in its normal neutral control position and said flap in its normal raised position together carrying out the upper and lower surface contour of the basic airfoil section for the wing, said aileron and flap being mounted for independent angular displacement relative to the wing, said flap extending rearwardly a distance beyond the trailing edge of the aileron so that the flap trailing edge for the span of the flap provides the trailing edge of the wing, and a vane member mounted on and spaced a distance above the trailing portion of the flap to the rear of the aileron and along the span thereof with the upper surface of the vane rearwardly carrying out the upper surface contour of the basic airfoil section of the wing when the flap is in normal raised position and the aileron in its normal neutral control position.

7. In combination in a wing, a wing flap, an aileron above said wing flap, the wing flap being extended a distance rearwardly beyond the trailing edge of the aileron, and a vane mounted along and spaced above the trailing portion of the flap to the rear of the aileron trailing edge to form an air passage between said vane and the flap, said vane also having its leading edge spaced rearwardly from the trailing edge of the aileron to form a slot therebetween when the aileron and flap are in normal neutral positions on the wing.

8. In a wing having an air displacement passage therethrough having a forward inlet and a discharge at the rear of the wing, a vane member at the forward inlet of the passage and movable between inlet opening and closing positions, a lift varying trailing flap mounted on the wing for movement between normal raised position and lowered lift increasing positions, a cable extending between and connecting said vane member and flap to positively hold the vane in closed position when the flap is in normal raised position, and the said cable so arranged that downward movement of the flap from its normal position establishes slack in the cable to release the vane member for opening movement independently of the flap.

9. In a wing having an air passage with a front inlet and a discharge at the rear of the wing, a vane member at the passage inlet, said vane member pivotally mounted for vertical swinging between inlet opening and inlet closing positions, a trailing wing flap mounted for vertical swinging between normal raised position and lowered lift increasing positions, a vertically disposed crank carried by said flap and having a slotted end, a bell-crank lever mounted in the wing opposite said vane member, a link connecting one arm of said bell-crank with the vane member, the other end of said bell-crank connected to a rearwardly extending rod member, the rear end of said rod member having a fixed pin slidably received in the slotted end of said flap carried crank, and said flap crank and rod member so relatively arranged that said pin is engaged by an end of said crank slot in a manner to positively maintain the vane member in closed position when the flap is in normal raised position but upon downward swinging of the flap to reposition the crank slot relative to the pin whereby said vane member may swing to passage inlet opening positions independently of the flap movement.

10. In an airfoil, a wing flap forming a portion of the lower surface of the airfoil, a control member above said flap forming a portion of the upper surface of the airfoil and extending a substantial distance rearwardly over said flap to the trailing portion of the latter, said control member and said wing flap in their normal neutral positions defining and carrying out the base section and contour of the airfoil, and said control member and wing flap so constructed and relatively arranged that with the wing flap in its normal position, the control member can be swung downwardly from neutral control position without interference from said wing flap.

11. In a wing of the variable lift type, a trailing under surface wing lift varying flap angularly displaceable between a normally raised position and lowered wing lift increasing positions, a control member mounted above said flap and forming a portion of the trailing upper surface of the wing, said control member extending rearwardly over said flap to the trailing portion of the latter and being angularly displaceable for control relative to the wing, said wing flap in normal raised position having the under surface thereof forming a portion of and defining the trailing portion of the basic airfoil section under surface and contour, said control member in its normal neutral control position having its upper surface forming a portion of and defining a trailing portion of the upper surface, and said control member and said flap being so constructed and relatively arranged that with the wing flap in normal raised position, the said control member is displaceable downwardly from neutral control position without displacement of the flap member from its normal position defining and maintaining the trailing portion of the basic airfoil section under surface contour.

12. In combination, in a high lift wing, a wing lift varying flap, an aileron superposed on said flap with its trailing portion at the trailing portion of the flap, said aileron and flap in their normal neutral positions defining and forming a portion of the contour of the basic airfoil section for the wing, said wing having an air displacement passage therethrough discharging rearwardly between said superposed flap and aileron, and said aileron and flap having their inner opposed surfaces formed and constructed to provide clearance space therebetween when in their normal positions whereby said aileron can be moved downwardly from its normal position for control without displacement of the wing flap from its normal position maintaining the basic airfoil section contour.

13. In a high lift wing having an air displacement passage therethrough, a movable vane member for opening and closing the inlet end of said passage, a lift varying wing flap at the discharge end of the passage, said flap being movable between normal raised position and lowered wing lift increasing positions, an aileron above said flap, said flap and aileron having their inner opposed surfaces formed and constructed to provide clearance space therebetween when in their normal positions whereby said aileron can be moved downwardly from its normal neutral position for control without displacement of the wing flap from its normal raised position, means interconnecting said vane and flap, and said means being arranged to provide for the vane being in fully opened position when said flap is in partially lowered position.

14. In combination, in a high lift wing, a wing lift varying flap, a control member above said flap, said control member and flap in their normal neutral positions defining and forming a portion of the contour of the basic airfoil section for the wing, and the inner surface of said flap being formed with a concave portion to provide a recess for receiving the opposite portion of the control member whereby the latter is movable downwardly from its normal position for control without displacement of the wing flap from its normal position maintaining the basic airfoil section contour.

15. In combination, in a wing, a wing lift varying flap, a vertically displaceable control member above said flap, said control member and flap in their normal neutral positions defining and forming a portion of the contour of the basic airfoil section for the wing, and the upper surface of said flap having a portion thereof formed concave to provide clearance space between said control member and the flap whereby the control member is downwardly displaceable from normal position without displacement of said flap from its normal position.

16. In an airfoil in combination, superposed surfaces in normal positions forming the trailing portion of the airfoil and carrying out the basic airfoil contour, said surfaces being mounted for independent angular displacement relative to the airfoil, and one of said surfaces being formed with a spanwise disposed recess at its inner side whereby with the surfaces in their normal position one of the surfaces is displaceable toward the other surface without displacement of or interference with said other surface.

17. In a wing, in combination, a flap mounted on the wing for displacement relative thereto to vary the lift capacity of the wing, said flap in normal position forming a portion of the under surface of the wing with the trailing portion of the flap forming the trailing portion of the wing and carrying out the basic airfoil section of the wing, and a member mounted on the flap spanwise thereof with the upper surface of said member forming a portion of and rearwardly carrying out the contour for the upper surface of the wing with the flap in normal position.

18. In a wing, in combination, a flap mounted on the wing for vertical displacement relative thereto, said flap in normal position having its outer surface forming a portion of the wing surface at one side of the wing and its trailing portion forming the trailing portion of the wing, and a vane member mounted at the inner side of the trailing portion of the flap in position disposed spanwise thereof with the outer surface of the vane member rearwardly carrying out the basic airfoil contour and forming a portion of the surface of the wing when said flap is in normal position relative to the wing.

19. In a wing, in combination, a flap mounted on the wing for vertical displacement relative thereto, said flap in normal position forming a portion of the under surface of the wing and having its trailing portion forming the trailing portion of the wing, a vane member mounted on the upper side of the trailing portion of said flap and disposed spanwise thereof, said vane member being spaced from the upper surface of the flap to form a passage between the flap and the member and in normal position of the flap the upper surface of the vane member being positioned to form a portion of the upper surface of the wing and rearwardly carry out the upper surface contour of the basic airfoil section of the wing, and a vertically displaceable control member mounted above the flap forward of said vane member and in normal position forming a portion of the wing upper surface and being spaced from the flap when the latter is in normal position whereby said control member can be downwardly displaced without displacement of the flap from normal position.

20. An airfoil provided with an air displacement passage therethrough, having an inlet at the forward portion of the airfoil and a discharge at the trailing portion of the airfoil, a vane member at said passage inlet movable between inlet opening and closing positions, a trailing flap member mounted on the airfoil for movement between normal raised position and lowered positions, mechanism coupling said vane member and flap member for positively maintaining the vane member closed when the flap member is in normal raised position, and said mechanism including a lost motion connection actuated by movement of the flap member from normal raised position to a partially lowered position to release said vane member for movement to open positions, independently of said flap member.

21. An airfoil provided with an air displacement passage therethrough having an inlet in the undersurface of the airfoil at the forward portion thereof, and a discharge at the trailing portion of the airfoil, a member movable between positions closing and opening the inlet to said passage, a flap mounted on the airfoil and forming a trailing portion thereof, said flap being movable between normal raised position on the airfoil and lowered positions, mechanism interconnecting said passage inlet opening and closing member and said flap adapted to positively maintain the member in the passage inlet closing position when the flap is in normal raised position, and said mechanism including a lost motion connection adapted to be actuated by movement of the flap from normal raised position to a partially lowered position to thereby release said member for movement independently of said flap to position fully opening said passage inlet with the flap in said partially lowered position.

22. In an airfoil in combination, a lift varying flap member mounted on said airfoil and being movable between normal raised position and lowered lift increasing positions, aerodynamic means for applying balancing forces to said flap member in a direction to aid movement of the flap to lowered positions, and mechanism operatively coupling said aerodynamic means with said flap member, said mechanism including a lost motion connection adapted to be actuated by the movement of said flap member to a predetermined position for releasing said aerodynamic means from balancing force applying association with the flap member during a portion of the range of movement of the flap member.

23. In an airfoil in combination, a trailing lift varying flap member mounted on said airfoil, aerodynamic means mounted at the forward portion of said airfoil for applying balancing forces to said flap member acting in a direction to aid downward movement of the latter, and mechanism operatively associating said aerodynamic means with said flap member for transmitting the balancing forces to the latter, said mechanism including a lost motion connection adapted to be actuated by movement of the flap member to a partially lowered position to release said aerodynamic means from operative association with said flap member, for movement of the flap member independently of said means throughout the range of movement of the flap member from said partially lowered position to fully lowered position.

RANDOLPH F. HALL.